Figure 1:
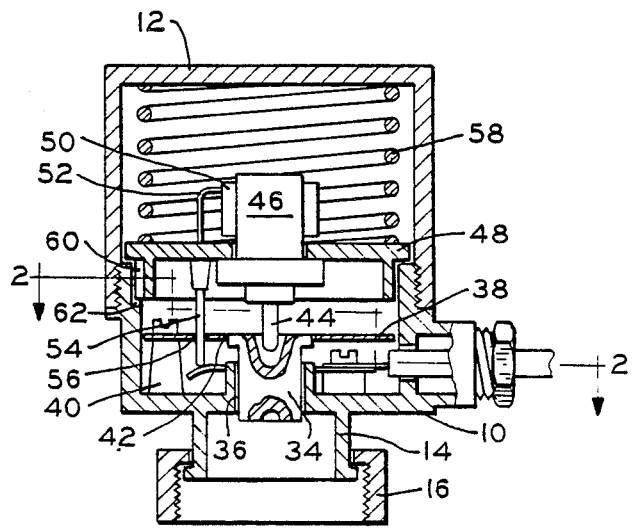

United States Patent [19]

Vollmer

[11] Patent Number: 4,500,036

[45] Date of Patent: Feb. 19, 1985

[54] ACTUATING MECHANISM

[75] Inventor: Rudolf Vollmer, Mosbach, Fed. Rep. of Germany

[73] Assignee: Honeywell Inc., Minneapolis, Minn.

[21] Appl. No.: 582,426

[22] Filed: Feb. 22, 1984

[51] Int. Cl.³ .............................................. G05D 23/20
[52] U.S. Cl. .................................... 236/68 B; 251/11; 251/134
[58] Field of Search ......................... 251/11, 134, 79; 236/68 B, 68 R; 310/80; 318/468

[56] References Cited

U.S. PATENT DOCUMENTS

| | | | |
|---|---|---|---|
| 2,721,721 | 10/1955 | Aubert | 251/134 |
| 2,795,381 | 6/1957 | Eskin | 236/93 A |
| 2,830,164 | 4/1958 | Weber et al. | 236/68 R X |
| 3,121,315 | 2/1964 | Matthies | 236/68 R X |
| 3,400,906 | 9/1968 | Stocklin | 236/68 R X |
| 3,472,478 | 10/1969 | Sherwood | 236/68 R X |
| 3,616,884 | 11/1971 | Balz | 318/468 X |
| 4,180,208 | 12/1979 | Obermaier | 236/93 A X |
| 4,268,006 | 5/1981 | Kunz et al. | 236/68 R X |

Primary Examiner—William E. Tapolcai
Attorney, Agent, or Firm—George W. Field

[57] ABSTRACT

An actuating mechanism comprises a lower housing portion and an upper housing portion. The lower housing portion is cup-shaped and receives a mounting plate into which a thermostatically working element together with a heating coil are inserted. The lower housing portion comprises leaves which are shielded by an insulating plate. Apertures in the insulating plate allow penetration of a working piston of the working element and of contact pins through the mounting plate during assembly of the housing portions whereat the contact pins engage the contact leaves so that the heating coil is supplied with a voltage only in the assembled condition of the actuating mechanism. A compression spring seves as an abutment for the mounting plate. By means of the compression spring the working element is protected against overload: if the pushing force of the working piston exceeds the biasing force of the compression spring, the mounting plate is shifted against the compression spring, and the contact pins lift off from the contact leaves so that the electrical circuit is disconnected.

8 Claims, 2 Drawing Figures

ACTUATING MECHANISM

The present invention relates to an actuating mechanism which may be used in zone valves for heating systems in buildings.

One such an actuating mechanism is known from DE-OS No. 1 600 713. There a thermostatically working element is fixed to a movable bracket by means of a mounting plate. The thermostatically working element abuts with its working piston against a bridge which is connected to a stationary bracket fixed to a housing. The stationary bracket comprises lateral guiding means for slidably mounting the displaceable bracket which bears at its lower end a valve rod. The thermostatically working element is surrounded by a heating coil which is connected by means of connecting wires to an electrical terminal board. The electrical terminal board is connected to a voltage supply by means of a socket and a cable passed through it.

The known actuating mechanism comprises many parts which require much assembly work and which made the production of the actuating mechanism very costly. Moreover, repair or exchange of the thermostatically working element cannot be done without switching off the voltage supply of the actuating mechanism.

It is therefore the object of the present invention to design an actuating mechanism of the above-mentioned type in such a way that it may be easily assembled and inexpensively produced, has small dimensions, and satisfies all aspects with respect to safety.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

In the drawing

Figure 2:
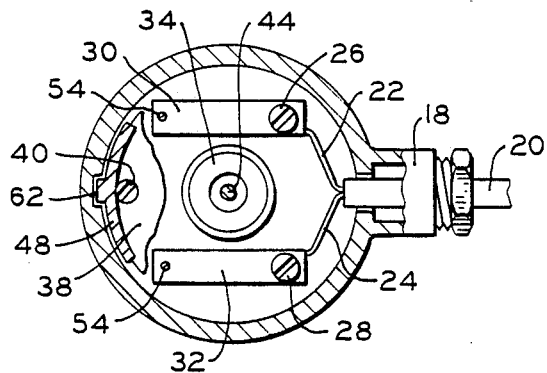

FIG. 1 is an axial longitudinal cross section through an actuating mechanism according to the invention; and FIG. 2 is a section along line 2—2 of FIG. 1.

The actuating mechanism comprises a lower housing portion 10 and an upper housing portion 12 both of which are cup-shaped and are made of plastic. Housing portions 10 and 12 are interconnected by means of internal and external threads. The lower housing portion 10 comprises at its lower end a central tube-shaped connecting flange 14 which may be connected to a valve not shown by means of a threaded coupling sleeve 16. Furthermore, the lower housing portion 10 is provided with a laterally arranged connecting socket 18 through which an electrical supply cable 20 is introduced into the lower housing portion 10. Conductors 22 and 24 of cable 20 are connected to terminals 26, 28 which are electrically connected to resilient contact leaves 30, 32 arranged parallel to each other. Between the contact leaves a collared distance piece 34 is displaceably arranged, to extend through a central opening 36 in the bottom of the lower housing portion 10 into the tube-shaped connecting flange 14 for engaging a valve actuator not shown.

An insulating plate 38 is fixed to the bottom of the lower housing portion 10 by means of at least one fixing screw 40 and is spaced at a distance from this bottom so that the current-carrying connecting terminals 26, 28 as well as the contact leaves 30, 32 are shielded and protected. A central opening 42 is provided within the insulating plate 38 through which opening distance piece 34 extends to contact a working piston 44 of a thermostatically working element 46. The thermostatically working element 46 is mounted in an insulating mounting plate 48 and is surrounded by a heating coil 50. Connecting wires 52 of the heating coil 50 are connected to contact pins 54 which are inserted in the mounting plate 48 and extend downwardly from it. For passing the contact pins 54 openings 56 are provided within the insulating plate 38. A compression spring 58 forces the mounting plate 48 against the front face of the lower housing portion. At the same time the contact pins 54 are forced against contact leaves 30, 32. The mounting plate 48 has an extension 60 which extends into a groove 62 within the lower housing portion 10 and therefore is secured against twisting.

The new actuating mechanism has a modular design, so that the electrical connections to coil 50 are made automatically during its assembly. Upon disassembly of the actuating mechanism, the heating coil automatically is disconnected from the voltage supply, and those portions within the lower housing portion 10 which remain connected to the supply voltage are shielded against inadvertent contact. When the heating coil 50 is energized from the supply voltage, the working element 46 is heated up, and the working piston 44 makes a stroke, displacing 35 to cause valve actuation. If the stroke of the working piston is interfered with, as by attaining the closing position of a valve acting together with the actuating mechanism, then the mounting plate 48 is displaced with respect to the working piston 44 aginst the force of the compression spring 58, whereat the contact pins 54 lift off from the related contact leaves 30, 32 so that the current flow is automatically interrupted. However, spring 58 acts through the working piston 44 to maintain operation of the valve, and as the heating element cools, pins 54 again make contact to reenergize the heater, and so on repeatedly as long as voltage is supplied on cable 20. This gives a strain release operation to the structure.

I claim:

1. Actuating mechanism comprising a heatable thermostatically working element which is arranged in a mounting plate displaceable against the force of a spring, and which has a working piston for actuating a control element by means of a distance piece and a heating coil surrounding the working element which is connectable to electrical contacts characterized in that the thermostatically working element, the electric heating coil, the mounting plate and contact pins arranged in said mounting plate represent a prefabricated unit.

2. Actuating mechanism according to claim 1, characterized in that the prefabricated unit is arranged in a lower housing portion which may be coupled with an upper housing portion and that a compression spring between the upper housing and the mounting plate pushes the contact pins against related contact leaves and the mounting plate against the lower housing portion when the housing portions are coupled with each other.

3. Actuating mechanism according to claim 2, characterized by an insulating plate arranged within the lower housing portion above the contact leaves, said insulating plate being provided with cut-outs for passing said distance piece and of the working element, and the contact pins of the mounting plate.

4. Actuating mechanism according to claim 3, characterized in that the contact leaves are connected to a supply voltage and are arranged parallel to each other at a distance which allows the mounting of the distance piece therebetween.

5. Actuating mechanism according to claim 2, characterized in that the upper housing portion and the lower housing portion are cup-shaped and consist of synthetic resin.

6. Actuating mechanism according to claim 2, characterized in that the mounting plate is axially displaced against the compression spring but is secured against twisting by guidance means including an extension of said mounting plate and a groove on said lower housing portion.

7. A linear actuator comprising, in combination:
a first housing portion having a wall rising from a bottom, and having a longitudinal axis; a displacement piece moveable along said axis and having an end extending to an aperture in said bottom for engaging the device to be actuated;
at least one resilient contact leaf carried by said bottom;
an assembly insertable in said housing portion and including a mounting plate supported on said wall, at least one contact pin positioned on said plate for engagement with said contact leaf, and a thermostatically working element carried by said plate and including a heated coil connected to said pin and a working piston moveable along said axis to engage said displacement piece;
a second housing piece engaging said wall of said first housing piece;
and a compression spring engaging said mounting plate and said second housing portion to urge said plate toward said wall.

8. A linear actuator comprising, in combination:
a first housing portion having a wall rising from a bottom, and having a longitudinal axis;
means for removeably mounting said housing portion on a device to be actuated;
a displacement piece moveable along said axis and having an end extending through an aperture in said bottom;
means for preventing passage of said displacement piece through said bottom;
at least one resiliant contact leaf carried by said bottom;
an assembly insertable in said housing portion and including a mounting plate supported on said wall, means for preventing rotation of said plate about said axis, at least one contact pin positioned on said plate for engagement with said control leaf, and a thermostatically working element carried by said plate and including a heated coil connected to said pin and a working piston moveable along said axis to engage said displacement piece;
an insulating plate mounted in said housing portion above said leaf and having apertures for traversal by said contact pin and said displacement piece;
a second housing piece engaging said wall of said first housing piece;
and a compression spring engaging said mounting plate on said second housing piece to urge said plate toward said wall.

* * * * *

UNITED STATES PATENT AND TRADEMARK OFFICE
CERTIFICATE OF CORRECTION

PATENT NO.  : 4,500,036

DATED       : February 19, 1985

INVENTOR(S) : RUDOLF VOLLMER

It is certified that error appears in the above-identified patent and that said Letters Patent is hereby corrected as shown below:

On the title page;

INID Code 73 Assignee, delete "Honeywell Inc." and and insert --Honeywell-Brauckmann G.m.b.H.--.

Signed and Sealed this

First Day of October 1985

[SEAL]

Attest:

DONALD J. QUIGG

Attesting Officer

Commissioner of Patents and Trademarks—Designate